T. E. MURRAY, Jr., AND J. B. MURRAY.
ELECTRICALLY WELDED TUBE AND METHOD OF MAKING THE SAME.
APPLICATION FILED JULY 3, 1920.
1,363,157.                                    Patented Dec. 21, 1920.
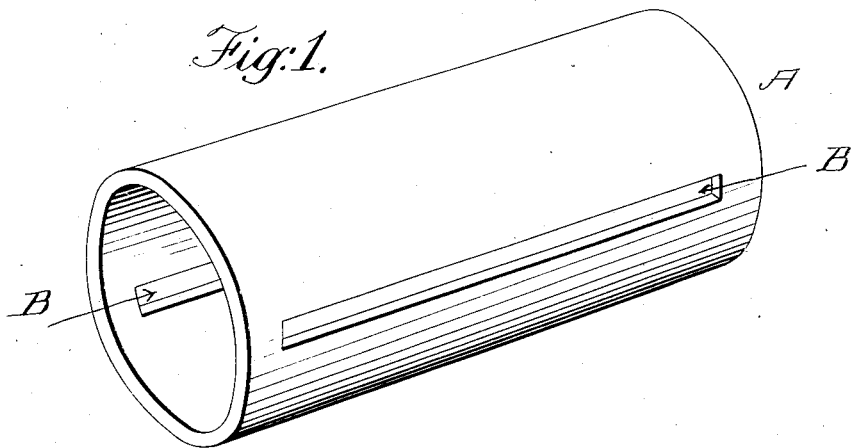
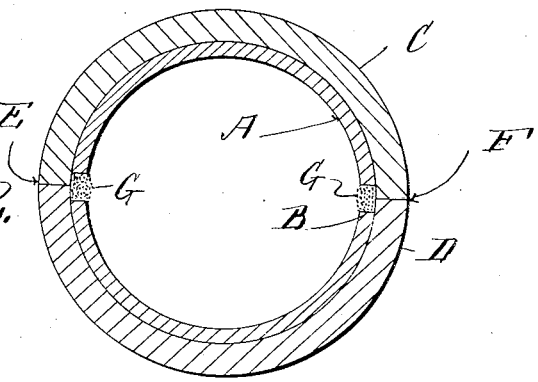

UNITED STATES PATENT OFFICE.

THOMAS E. MURRAY, JR., AND JOSEPH B. MURRAY, OF BROOKLYN, NEW YORK.

ELECTRICALLY-WELDED TUBE AND METHOD OF MAKING THE SAME.

1,363,157. Specification of Letters Patent. Patented Dec. 21, 1920.

Application filed July 3, 1920. Serial No. 393,859.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Electrically-Welded Tubes and Methods of Making the Same, of which the following is a specification.

The invention is a tube formed of an inner tube and an outer tube electrically united, and a method of making the same.

In the accompanying drawing—

Figure 1 is a perspective view of the inner tube. Fig. 2 is a transverse section of the combined tubes electrically welded together.

Similar letters of reference indicate like parts.

The inner tube A has in its wall oppositely placed slots B. The outer tube is formed in two longitudinal half sections C, D which are disposed in contact registry. The inner tube A is placed within the outer tube, so that the slots B come opposite the joints E, F between sections C, D, and so that the metal G extruded at said joints during the welding operation enters slots B and so unites the tubes.

We claim:

1. The method of electrically uniting an inner tube and an outer tube formed in two longitudinal half sections disposed in contact registry, which consists in forming a slot in the wall of said inner tube, placing said inner tube between the sections of said outer tube with said slot in registry with a joint between said sections and electrically welding said sections, whereby the metal extruded from said joint is caused to enter said slot.

2. The combination of an outer tube formed in two longitudinal half sections disposed in contact registry and electrically welded together, and an inner tube having longitudinal slots oppositely disposed in its wall; the said tubes being disposed with the slots in said inner tube in registry with the joints in said outer tube and containing metal extruded from said joints.

In testimony whereof we have affixed our signatures in presence of two witnesses.

THOMAS E. MURRAY, JR.
JOSEPH B. MURRAY.

Witnesses:
GERTRUDE T. PORTER,
MAY T. MCGARRY.